UNITED STATES PATENT OFFICE 2,377,751

METHOD OF MAKING FLUORENONES

Edgar C. Britton, Clarence L. Moyle, and Fred Bryner, Midland, Mich., assignors to The Dow Chemical Company, Midland, Mich., a corporation of Michigan No Drawing. Application August 24, 1940,
Serial No. 354,107

10 Claims. (Cl. 260—590)

This invention concerns a method of making fluorenone and nuclear-substituted derivatives thereof. For convenience, such compounds are hereinafter referred to generically as "fluorenones." The invention particularly concerns the preparation of fluorenones having the general formula:

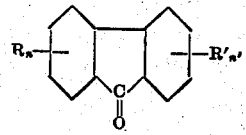

wherein R and R' represent the same or different members of the group consisting of hydrogen and hydroxyl, alkyl, aralkyl, cycloalkyl and aryl radicals and $n$ and $n'$ are integers not exceeding 2. It also concerns a new compound, i. e. 3-phenyl-fluorenone, prepared by the method.

According to the invention, fluorenones are prepared by reacting alkalies with ortho-halo-diaryl ketones under conditions such that hydrogen halide is removed from the molecule of the halo-aromatic ketone with resultant ring closure to form the fluorenone products. The net result of the treatment is illustrated by the equation:—

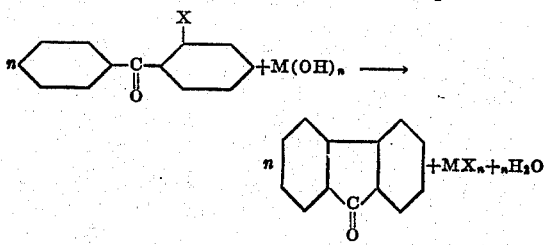

wherein X represents a halogen, M represents a metal and $n$ is an integer corresponding to the valence of the metal.

It is known that an alkali may react with a halo-diaryl ketone in any of several ways depending upon the reaction conditions employed; e. g. that in the presence of alcohol the halogen may be replaced by hydrogen and the keto group be reduced, whereas in the presence of water and a copper-containing catalyst the halogen may be removed by hydrolysis and a hydroxy-diaryl ketone such as parahydroxy-benzophenone be produced. In so far as we are aware, however, the reaction of an alkali with a halo-diaryl ketone to form a fluorenone has not heretofore been known.

We have found that a fluorenone may be formed by heating a mixture of an aqueous alkali and an ortho-halo-diaryl ketone, containing a halogen substituent on one aromatic nucleus in a position ortho to the keto group and a hydrogen atom in the other aromatic nucleus ortho to the keto group, in the presence of a ferrous metal, e. g. iron or steel. The iron apparently catalyzes the reaction for the formation of fluorenones, since the latter are not formed in appreciable yield when iron is omitted.

Examples of halo-diaryl ketones which may be employed in the reaction are 2-chloro-benzophenone, 2-bromo-benzophenone, 2-chloro-4-methyl-benzophenone, 2 - bromo -4-ethyl-benzophenone, 2 - chloro - 4 - butyl - benzophenone, 2-chloro-4'-methyl-benzophenone, 2-chloro-4.6-dimethyl - benzophenone, 2-chloro - 2'.4'-diethyl-benzophenone, 2 - chloro - 4.6-dimethyl-2'.4'-dimethyl-benzophenone, 2-chloro-4'-phenyl-benzophenone, 2 - chloro - 4-phenyl-4'-phenyl-benzophenone, etc. Polyhalo-benzophenones, such as 2.4-dichloro-benzophenone, 2.4 - dibromo-benzophenone, 2-bromo-4-chloro-benzophenone, etc., may also in some instances be employed satisfactorily in the process although their employment sometimes leads to the formation of a mixture of different fluorenones, e. g. a mixture of 3-hydroxy-fluorenone and a 3-halo-fluorenone. For sake of clarity in referring to the substituted fluorenones, it may be mentioned that the positions in the fluorenone molecule are numbered as follows:

As the alkali reactant, we usually employ an aqueous sodium or potassium hydroxide solution of between 5 and 15 per cent by weight concentration, but solutions of lower or higher concentration may be used, if desired. Also, other alkali and alkaline earth metal bases, such as sodium or potassium carbonate, calcium hydroxide, barium hydroxide, magnesium hydroxide, etc., may be used instead of, or together with, an alkali metal hydroxide.

The iron required to catalyze the formation of fluorenones is usually supplied by carrying the reaction out in an iron or steel bomb or autoclave, in which case the reactor itself provides the catalyst. However, the reaction may be carried out in reactors constructed of, or lined with, other materials, such as copper, glass, etc., in which case iron is added as catalyst. Only a small proportion of iron, e. g. 0.05 gram atom of iron per mole of halo-ketone, is required, but it may be used in as large a proportion as desired.

The reaction is usually carried out by heating the ortho-halo-diaryl ketone and a molecular excess of aqueous alkali metal hydroxide, e. g. from 1 to 4 moles or more of the hydroxide per mole of ketone, to a reaction temperature above 200° C., preferably between 225° and 300° C., in an iron or steel autoclave. From 2 to 10 hours of heating usually suffices for completion of the reaction, although longer heating may in some instances be required. The extent of reaction may be determined at any time by withdrawing a portion of the reaction mixture and analyzing it to determine the amount of inorganic chloride formed.

After completing the reaction, the mixture is cooled, withdrawn from the reactor, and the fluorenone product is separated in any suitable way. Frequently, the fluorenone crystallizes during cooling of the reaction mixture, in which case it may be separated mechanically from the liquor. It may be purified by washing it with alkali to remove any hydroxy-ketone by-products which may be occluded therewith and/or recrystallizing it from an organic solvent, e. g. methanol, ethanol, propanol, acetone, etc. In most instances, the liquor remaining after removal of the fluorenone from the crude reaction mixture may be acidified, e. g. with sulphuric or hydrochloric acid, etc., to liberate a small amount of an ortho-hydroxy-diaryl ketone, e. g. ortho-hydroxy-benzophenone, as a by-product. The hydroxy ketone is separated from the acidified liquor in any of the usual ways; for instance, by extraction with ethylene chloride, propylene chloride, or other water-immiscible solvent and evaporation of the solvent from the extract.

The following examples describe certain ways in which the principle of the invention has been applied but are not to be construed as limiting its scope.

Example 1

A mixture of 32.7 grams (0.151 mole) of 2-chloro-benzophenone, 16.5 grams (0.41 mole) of sodium hydroxide, 148 grams of water and 0.2 gram of cuprous oxide was heated in a rotating iron bomb at a temperature of approximately 240° C. for 6 hours. The bomb was then cooled and the charge removed. The reacted mixture contained a considerable amount of crystalline fluorenone, which was separated from the liquor, granulated and washed thoroughly with a dilute sodium hydroxide solution to remove any hydroxy-benzophenone occluded therewith. The fluorenone was then purified by recrystallization from ethanol. There was obtained 15.5 grams, or 57 per cent of the theoretical yield, of purified fluorenone.

Example 2

Fluorenone was also prepared in good yield by heating a mixture of 36.8 grams of 2-chloro-benzophenone, 204 grams of an aqueous sodium hydroxide solution of 10 per cent by weight concentration, and 3.7 grams of iron powder in a rotating bomb internally lined with copper at a temperature of 250° C. for 3 hours. The fluorenone product was separated by procedure similar to that described in Example 1.

Example 3

A mixture of 41.5 grams (0.18 mole) of 2-chloro-4'-methyl-benzophenone, 21.6 grams (0.54 mole) of sodium hydroxide, 194 grams of water, and 2.1 grams of cuprous oxide was heated in an iron bomb at a temperature of 250° C. for 3 hours. The bomb was then cooled, the charge removed, and the product was separated and purified as in Example 1. There was obtained 10 grams of crystalline 3-methyl-fluorenone having a melting point of 66–67.5° C. The product has the formula:

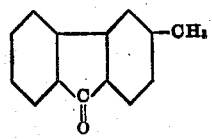

Example 4

A mixture of 31.8 grams (0.125 mole) of 2,4'-dichloro-benzophenone, 31.8 grams (0.75 mole) of sodium hydroxide, 86 grams of water and about 0.3 gram of iron filings was heated at 250° C. in an iron bomb for 3 hours, after which the bomb was cooled and the charge removed. The reaction mixture was acidified with sulphuric acid, whereupon an oil separated which solidified on standing. The solid product was removed from the liquor and dried. It weighed 21.6 grams and melted at temperatures between 184° and 192° C. and was impure 3-hydroxy-fluorenone containing some hydroxy derivative of benzophenone admixed therewith. This impure product may be recrystallized from ethanol, or other solvent, to obtain the 3-hydroxy fluorenone in purified form. The product has the formula:

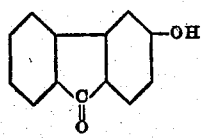

Example 5

A mixture of 59.2 grams of 2-chloro-4'-phenyl-benzophenone, 24.5 grams of sodium hydroxide, 220.5 grams of water and 2.95 grams of cuprous oxide was heated in a rotating steel bomb at a temperature of 250° C. for 2 hours. The bomb was then cooled, opened and washed free of the reaction mixture with acetone. The resultant solution was filtered after which the acetone was evaporated leaving a mixture of water and a viscous oil. The latter was washed thoroughly with water, dried, and fractionally distilled under vacuum. The fraction distilling at temperatures between 230° and 250° C. at 4 millimeters absolute pressure was 3-phenyl-fluorenone. It was collected as a viscous orange-colored oil having the index of refraction $n_D^{30}=1.689$. It crystallized upon standing for several days. The crystals melted at temperatures between 83° and 85° C. The molecular weight found for the compound was 259.1, which corresponds closely to the theoretical value of 256, thus indicating that the product was quite pure. The product has the formula:

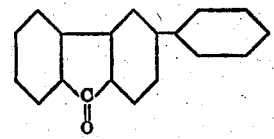

The 3-phenyl fluorenone is useful as a coloring agent, e. g. a pigment, and as an intermediate product from which a variety of dyes may be prepared. It may also be used as a plasticizer and a coloring agent for natural and synthetic resins and when so-employed frequently has the further function of stabilizing the resins against the action of light.

In the foregoing Examples 1, 2, 3, and 5, the reactions to form fluorenones were carried out in the presence of copper or a copper compound, which copper-containing substances are known to promote the hydrolysis of halogenated aromatic compounds to form hydroxy compounds. It was observed that the presence of such copper-containing substances did not prevent the reactions to form fluorenones. However, the presence of iron was required in order to form the fluorenones.

The invention may be applied in making other nuclear-substituted fluorenones; e. g. in preparing 3.6-dimethyl-fluorenone from 2-chloro-4.4'-dimethyl-benzophenone; in making 3.6.8-triethyl-fluorenone from 2-bromo-4.2'.4'-triethyl-benzophenone; 3-tertiarybutyl-fluorenone from 2-chloro-4'-tertiarybutyl-benzophenone, etc.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. A method for making fluorenones which comprises heating an ortho-halo-diaryl ketone of the benzene series together with more than its molecular equivalent of an alkali metal hydroxide in aqueous solution to a reaction temperature above 200° C. in the presence of a catalyst which contains metallic iron as an essential ingredient.

2. The method which comprises heating a mixture of a diaryl ketone having the general formula:

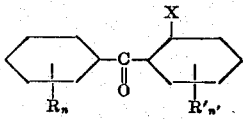

wherein X represents a halogen selected from the group consisting of chlorine and bromine, R and R' represent members of the group consisting of hydrogen and alkyl substituents, and $n$ and $n'$ each represents an integer not exceeding 2, and a molecular excess of alkali metal hydroxide in aqueous solution at superatmospheric pressure to a reaction temperature between about 225° and about 300° C. in the presence of a catalyst which comprises metallic iron as an essential ingredient to form a fluorenone, and separating the latter.

3. The method which comprises heating a ketone having the general formula:

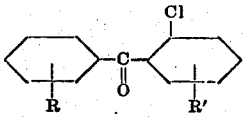

wherein R and R' represent members of the group consisting of hydrogen and alkyl substituents, together with a molecular excess of an alkali metal hydroxide in dilute aqueous solution, to a temperature between about 225° and about 300° C. at a pressure corresponding to the vapor pressure of the mixture and in the presence of a catalyst which comprises metallic iron as an essential ingredient, whereby a fluorenone is formed, and separating the product.

4. A method of making fluorenone which comprises heating a halo-benzophenone, selected from the class consisting of 2-chloro-benzophenone and 2-bromo-benzophenone, together with an aqueous alkali metal hydroxide and a catalyst which contains metallic iron as an essential ingredient to a reaction temperature above 200° C. at a pressure corresponding to the vapor pressure of the mixture.

5. A method which comprises heating 2-chloro-benzophenone and an aqueous alkali metal hydroxide solution in the presence of a catalyst which comprises metallic iron as an essential ingredient to a temperature between about 225° and about 300° C. at superatmospheric pressure and thereafter separating fluorenone from the mixture.

6. The method which comprises heating a nuclear - alkylated ortho - halo - benzophenone, wherein the non-halogenated aromatic nucleus contains a hydrogen atom ortho to the keto group, with an excess of aqueous alkali metal hydroxide solution in the presence of a catalyst which comprises metallic iron as an essential ingredient to a reaction temperature between about 225° and about 300° C. at superatmospheric pressure, whereby an alkylated fluorenone is formed.

7. The method of making 3-methyl-fluorenone which comprises heating a 2-halo-4'-methyl-benzophenone with an excess of an aqueous alkali metal hydroxide solution at superatmospheric pressure to a temperature between about 225° and about 300° C. in the presence of a catalyst which contains metallic iron as an essential ingredient.

8. The method of making 3-methyl-fluorenone which comprises heating 2-chloro-4'-methyl-benzophenone with an excess of a dilute aqueous sodium hydroxide solution at superatmospheric pressure to a temperature between about 225° C. and about 300° C. in the presence of a catalyst which comprises metallic iron as an essential ingredient.

9. The method of making 3-phenyl-fluorenone which comprises heating a 2-halo-4'-phenyl-benzophenone with an aqueous alkali metal hydroxide to a reaction temperature above 200° C. in the presence of a catalyst which contains metallic iron as an essential ingredient.

10. The method of making 3-phenyl-fluorenone which comprises heating 2-chloro-4'-phenyl-benzophenone with excess dilute aqueous sodium hydroxide solution at superatmospheric pressure to a temperature between about 225° and about 300° C. in the presence of a catalyst which comprises metallic iron as an essential ingredient.

EDGAR C. BRITTON.
CLARENCE L. MOYLE.
FRED BRYNER.